(12) United States Patent
Mishra et al.

(10) Patent No.: US 10,203,211 B1
(45) Date of Patent: Feb. 12, 2019

(54) VISUAL ROUTE BOOK DATA SETS

(71) Applicant: Amazon Technologies, Inc., Seattle, WA (US)

(72) Inventors: Pragyana K. Mishra, Seattle, WA (US); Jonathan Blair Norwood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/975,432

(22) Filed: Dec. 18, 2015

(51) Int. Cl.
*G01C 21/34* (2006.01)
*G01C 21/36* (2006.01)
*G06Q 10/08* (2012.01)

(52) U.S. Cl.
CPC ..... *G01C 21/3415* (2013.01); *G01C 21/3602* (2013.01); *G06Q 10/0838* (2013.01)

(58) Field of Classification Search
CPC .... G01C 21/3608; G01C 21/00; G01C 21/20; G01C 21/28; G01C 21/3461; G01C 21/3492; G01C 21/362; G01C 21/3623; G01C 21/3632; G01C 21/3647; G01C 21/34; G01C 21/36; G01C 21/32; B60W 40/105; B60W 2420/42; G06Q 10/08
USPC ......... 701/1, 2, 41, 117, 427, 439, 530, 532, 701/533, 424; 348/135; 345/501
See application file for complete search history.

(56) References Cited

U.S. PATENT DOCUMENTS

| | | | |
|---|---|---|---|
| 7,155,336 B2 | 12/2006 | Dorfman et al. | |
| 7,272,501 B2 | 9/2007 | Dorfman et al. | |
| 7,359,797 B2 | 4/2008 | Dorfman et al. | |
| 7,587,276 B2 | 9/2009 | Gold et al. | |
| 7,756,630 B2 | 7/2010 | Dorfman et al. | |
| 8,543,323 B1 | 9/2013 | Gold et al. | |
| 8,572,077 B2 | 10/2013 | Dorfman et al. | |
| 8,606,493 B1 | 12/2013 | Gold et al. | |
| 9,182,895 B1 | 11/2015 | Gold et al. | |
| 2002/0069097 A1 | 6/2002 | Conrath | |
| 2004/0215480 A1* | 10/2004 | Kadaba | B07C 3/00 705/338 |
| 2006/0167734 A1* | 7/2006 | Scott | G06Q 10/00 705/7.16 |
| 2006/0170689 A1* | 8/2006 | Maier | B60K 35/00 345/501 |

(Continued)

FOREIGN PATENT DOCUMENTS

WO   2005094550 A2   10/2005

*Primary Examiner* — Anne M Antonucci
*Assistant Examiner* — Sanjeev Malhotra
(74) *Attorney, Agent, or Firm* — Athorus, PLLC

(57) ABSTRACT

Route images that have been acquired along delivery routes may be automatically analyzed for visual saliency (e.g., based on image motion, image content, sensor information, carrier actions, etc.) and stored along with related route information as part of a visual route book data set. The route images may be acquired by carriers utilizing mobile recording devices (e.g., mobile phones, wearable cameras, vehicle mounted cameras, etc.) while travelling along delivery routes for delivering items. For assisting a carrier in navigating along a delivery route, route images and related route information, such as visual cues associated with salient objects or features, may be selected from the visual route book data set and presented to the carrier (e.g., as part of a visual route summary and/or as based on a current location of the carrier).

20 Claims, 10 Drawing Sheets

(56) References Cited

U.S. PATENT DOCUMENTS

| | | | | |
|---|---|---|---|---|
| 2007/0225893 A1* | 9/2007 | Park | G01C 21/3492 | 701/117 |
| 2007/0282704 A1 | 12/2007 | DeMaster et al. | | |
| 2008/0027646 A1* | 1/2008 | Kawabata | G01C 21/28 | 701/530 |
| 2009/0063039 A1* | 3/2009 | Tsai | G01C 21/3623 | 701/533 |
| 2009/0319168 A1* | 12/2009 | Sugimoto | B41J 3/46 | 701/532 |
| 2009/0326971 A1* | 12/2009 | Piccinini | G06Q 10/08 | 705/1.1 |
| 2010/0223173 A1* | 9/2010 | Kadaba | B07C 3/00 | 705/34 |
| 2010/0253775 A1* | 10/2010 | Yamaguchi | G01C 21/3647 | 348/135 |
| 2011/0010023 A1* | 1/2011 | Kunzig | G01S 5/16 | 701/2 |
| 2011/0320114 A1* | 12/2011 | Buxton | G01C 21/3608 | 701/439 |
| 2012/0120069 A1* | 5/2012 | Kodaira | G06F 17/30271 | 345/419 |
| 2012/0246090 A1* | 9/2012 | Griffith | G06Q 10/08 | 705/330 |
| 2013/0013204 A1* | 1/2013 | Kazama | G01C 21/20 | 701/533 |
| 2014/0058839 A1 | 2/2014 | Dorfman et al. | | |
| 2014/0156181 A1* | 6/2014 | Watanabe | G01C 21/3632 | 701/427 |
| 2014/0309926 A1* | 10/2014 | Shimada | G01C 21/3679 | 701/424 |
| 2014/0324247 A1* | 10/2014 | Jun | G07C 5/0866 | 701/1 |
| 2014/0343849 A1* | 11/2014 | Ohzawa | G01C 21/3492 | 701/537 |
| 2015/0294153 A1* | 10/2015 | Naithani | G06K 9/00798 | 382/108 |
| 2016/0026379 A1 | 1/2016 | Gold et al. | | |
| 2016/0189393 A1* | 6/2016 | Rao | G06K 9/00798 | 701/41 |
| 2017/0122762 A1* | 5/2017 | van der Molen | G01C 21/32 | |

* cited by examiner

VISUAL ROUTE BOOK DATA SETS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. Physical delivery of items to user specified locations has improved dramatically over the years, with some retailers offering next day delivery of ordered items, or in some cases even faster delivery (e.g., within 1 or 2 hours). When items are to be delivered, agents, associates, couriers, or other carriers may be tasked with transporting the items to the user specified delivery locations. In some instances, certain factors (e.g., hard to find locations, intricate travel routes, details specific to certain locations, etc.) may make the instructions to the carriers relatively complex and difficult to understand.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
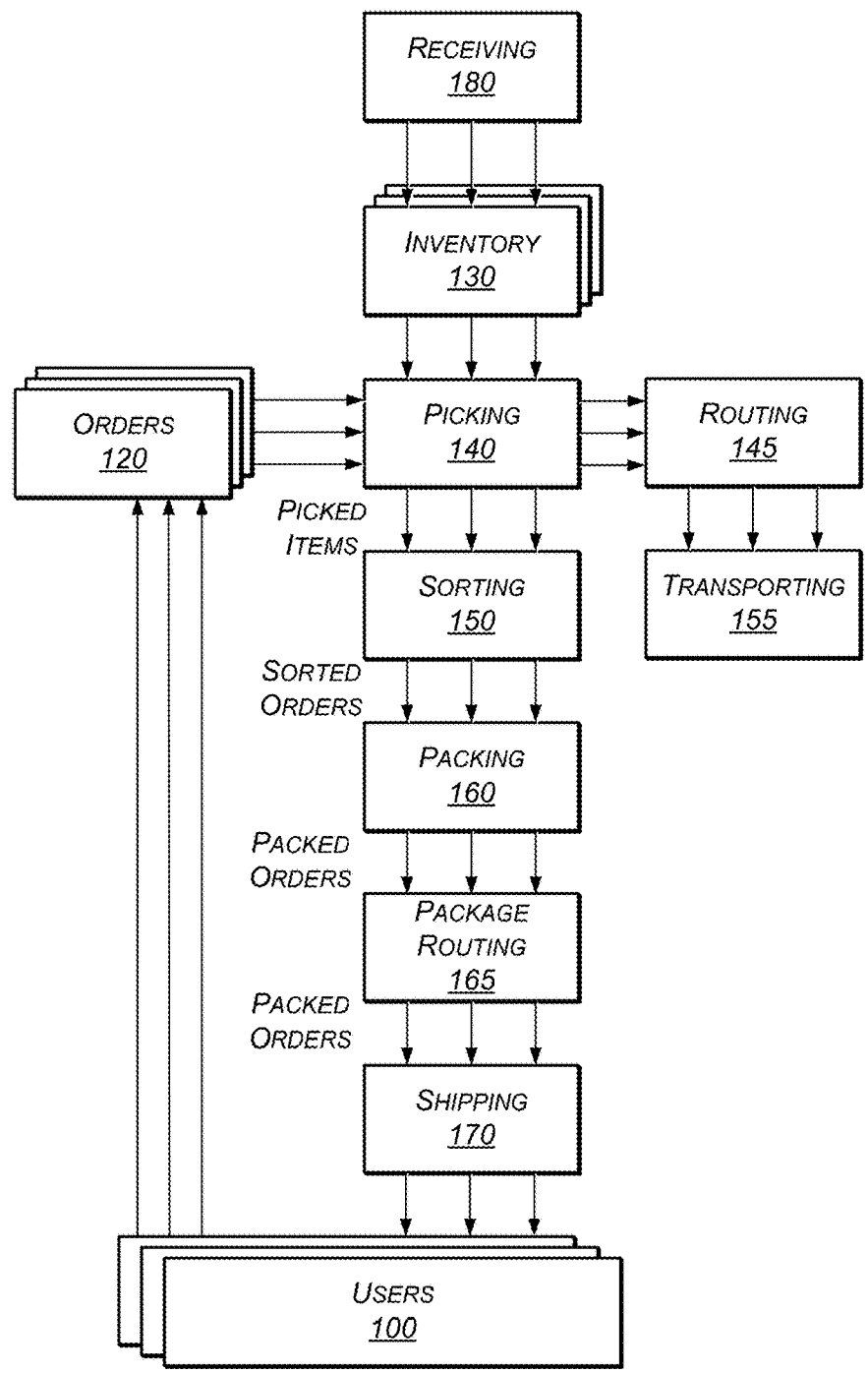
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a system in which route images that have been acquired along delivery routes may be automatically analyzed for visual saliency and stored along with associated route information as part of a visual route book data set. In various implementations, route images may be received from various sources. For example, a carrier or other individual may be provided with a recording device (e.g., a cell phone, a video camera, a wearable camera, a vehicle mounted camera, etc.) that records route images along a delivery route. As some examples, route images may be collected and stored which correspond to various instructions such as "right turn at the stop sign", "stop at the red brick tudor", "enter through the gate in the white picket fence", "stop at the third yellow craftsman house", "walk down the gravel road", "park in the 30 minute loading zone", or "walk to the red door". It will be appreciated that such route images may be representative of various route-specific details that are not part of any gazetteer, publicly-available, or geospatial data provider databases.

The analysis for selecting which route images will be included in a visual route book data set may include determinations such as which route images correspond to changes (e.g., changes in direction, speed, mode of transportation, etc.) along a delivery route. In this regard, various visual saliency factors (e.g., based on image motion, image content, sensor information, carrier actions, etc.) may be utilized as part of the analysis. For example, analysis based on image motion may include determining motion vectors from consecutive route images for determining an optical flow and corresponding movements (e.g., moving forward, stopping, turning right, turning left, veering right, veering left, etc.). As another example, analysis based on image content may include using computer vision recognition and/or classification algorithms for detecting salient objects (e.g., traffic signs or signals, road intersections, mailboxes, doors, gates, parking signs, dock entrances, garage doors, structures, stairs, etc.). With regard to image content, it will be appreciated that in some instances various changes may occur to detected salient objects and/or features. For example, a front façade or paint color of a building may change, or different decorations may be added or removed. Some types of changes may be seasonal or otherwise time-dependent. For example, during certain holidays, various salient objects (e.g., decorations) may be detected during a limited time before and during the relevant dates (e.g., Christmas, Halloween, etc.). Also, some objects may be more salient during daylight hour deliveries versus other objects which may be more salient during evening hour deliveries (e.g., lights, etc.). In various implementations, by obtaining and analyzing updated route images, such changes in saliency may be captured, analyzed and recorded. For example, carriers who regularly travel along delivery routes may utilize recording devices (e.g., wearable cameras, vehicle mounted cameras, etc.) to regularly record such images (e.g., on different dates and at different times). Such images may be analyzed and stored as part of updates to visual route book data sets. In one implementation, the analysis may include comparing a route image to a prior route image that was acquired at the same location, and an object that is detected in the route image may be determined to represent a change from the prior route image. On the basis of such a determination, the route image may be selected for inclusion in a visual route book data set (e.g., as an updated image, or an image corresponding to a different time of day or year, etc.). It will be appreciated that by acquiring such route images and performing such analysis, that objects, etc. that are included in route images which are utilized as visual cues for navigational reference for carriers may be regularly tracked and updated.

In addition to analysis based on image content, as another example, analysis based on sensor information may involve different types of sensor information, such as GPS sensor coordinates (e.g., as corresponding to specific intersections, turns, exits and entrances to freeways, parking locations, points off a vector road network, etc.), or velocity sensor readings (e.g., as indicating stops and starts of movement, etc.). As another example, analysis based on carrier actions may involve different types of carrier actions (e.g., package scans, getting into or out of a vehicle, opening a vehicle door, turning on or off an ignition key, applying brakes, etc.), which may in some instances be detected by various devices (e.g., a package scanner, sensors included as part of a vehicle's computing system, etc.).

When a carrier is to deliver one or more items to delivery locations and a delivery route is determined, route images and related information may be selected from the visual route book data set for presentation to the carrier to assist the carrier in navigating along the delivery route. Such route images and associated metadata may correspond to route elements such as transitions, stops, etc. Examples related to transitions may include turns, exits, ramps, traffic conditions, detours, speed limit signs, school zones, other neighborhood navigation details, etc. Examples related to stops may include parking locations and delivery locations, as well as details about receptionists, concierges, customer availability times, service times, placement locations, storage areas, entrances, parking times, route segments between parking locations and delivery locations, etc. In various implementations, the selected route images and associated information may be sequenced and organized as a cohesive presentation as part of a visual route summary. For example, the visual route summary may be presented as a visual storyboarding or playback in the form of a video sequence of route images or individually presented route images that represent the transitions and stops along the delivery route. In various implementations, selected route images and associated information may be presented to a carrier in real-time based on a current location of the carrier. For example, a current location along a delivery route may be determined (e.g., utilizing GPS signals) and route images and associated information that are relevant to the current location may be presented to the carrier. It will be appreciated that such techniques allow descriptions of delivery routes and delivery instructions to be presented to carriers in an easily understood format, and for which the presented route images and visual cues related to salient objects or features associated with particular route images effectively represent route details that are visual in nature.

A block diagram of a materials handling facility which, in one implementation, may be an order fulfillment facility configured to utilize various systems and methods described herein (e.g., with regard to deliveries of items), is illustrated in FIG. 1. In this example, multiple users 100 may submit orders 120, where each order 120 specifies one or more items from inventory 130 to be shipped or otherwise delivered (e.g., by a carrier) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a carrier, such as described below with respect to FIG. 2, has been designated for a delivery, the item(s) of one or more shipment sets may be picked at the picking operation 140 and sent to a routing operation 145. In various implementations, certain specified techniques may be utilized to enable tracking, identification, and/or association of items to be carried by each carrier. For example, during a picking operation, an agent or automated system (e.g., robotic) within the materials handling facility may scan the bar code of a container (e.g., a box, bin, bag, etc.) that the carrier will carry and/or scan a barcode or identifier of the picked item as the item is picked and/or placed into the container. Scanning of the container and/or the picked item may be utilized to associate and track the item with the carrier. As the containers that the carriers will carry are filled, the routing operation 145 may route the containers to an appropriate transporting operation 155 from which the carriers may acquire the items for delivery along various delivery routes, or from which the items may be transported (e.g., by trucks or other transportation mechanisms) to a pickup location where a carrier will acquire the items.

In other examples, some picked items may be delivered to one or more stations in the order-fulfillment facility for sorting 150 into their respective shipment sets and for packing 160 in shipping packages. A package routing operation 165 may sort orders for packing in shipping packages to one or more shipping operations 170, from which they may be shipped to the users 100. In various implementations, carriers may be utilized for the shipping and may be considered as an alternative to shipping by other traditional methods (e.g., United States Postal Service, FedEx, UPS, etc.). Depending on the specific implementation, the package routing operation 165 may be either automated or manual. The package routing operation 165 may receive an indication of the destination to which each packed shipment set should be routed from a central control system. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a carrier or other shipment method.

The arrangement and order of operations illustrated by FIG. 1 is merely one example of many possible implementations of the operation of a materials handling facility, such as an order-fulfillment facility, that enables fulfillment of user orders. Other types of materials handling, manufacturing, or order fulfillment facilities may include different, fewer, or additional operations and resources, according to different implementations.

Figure 2:
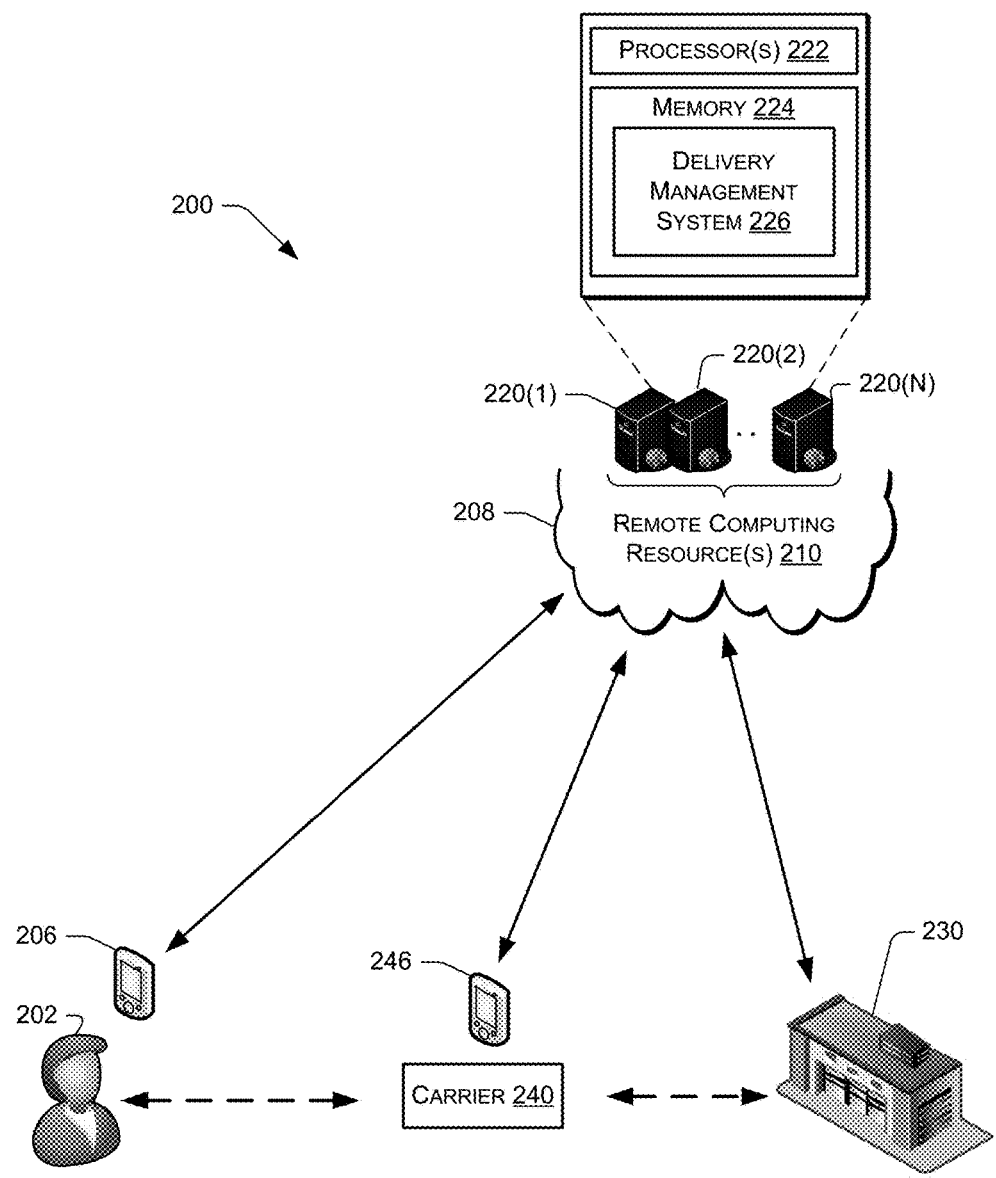
FIG. 2 depicts a block diagram of a delivery environment, according to some implementations.

FIG. 2 is a block diagram of an illustrative delivery environment 200 that may include multiple user interfaces (e.g., for allowing a user 202 to place an order for an item, for allowing a carrier 240 to receive delivery route information, etc.). As will be described in more detail below with respect to FIG. 9, a user interface that is presented on a carrier's mobile device 246 may include route images, instructions and/or other information for assisting the carrier in navigating along a delivery route for delivering an ordered item. As will be described in more detail below, the ordered item may be transported by the carrier 240 along a delivery route that extends from a materials handling facility 230 to a delivery location for a user 202 (e.g., corresponding to a delivery address at the user's home, business, etc.). It will be appreciated that while such deliveries and delivery routes may generally be described herein as related to deliveries of ordered items, other types of deliveries may also be encompassed by the principles disclosed herein. For example, a carrier may also retrieve an item from a user (e.g., as part of a return, etc.) and may follow a delivery route for delivering the item back to a materials handling facility 230 or other location.

A user interface that allows a user 202 to place an order may be a graphical user interface, an audio only interface, a multi-mode interface, or any other interface for interacting with the user 202. The user interface may be provided to the user 202 through any type of electronic device 206, such as a tablet, desktop, laptop, smart phone, personal digital assistant, netbook, etc. The user interface may be delivered to the electronic device 206 by one or more remote computing resources 210 that make up part or all of an electronic commerce shopping environment. In other embodiments, the user interface may include direct communication between a user and an agent.

The remote computing resources 210 may form a portion of a network-accessible computing platform implemented as a computing infrastructure of processors, storage, software, data access, and other components that is maintained and accessible via a network 208. Services, such as e-commerce shopping services, offered by the remote computing resources 210 do not require that the user have knowledge of the physical location and configuration of the system that delivers the services. The electronic device 206 may communicatively couple to the remote computing resources 210 via the network 208, which may represent wired technologies (e.g., wires, USB, fiber optic cable, etc.), wireless technologies (e.g., RF, cellular, satellite, Bluetooth, etc.), and/or other connection technologies. The network 208 carries data between the electronic device 206 and the remote computing resources 210.

After receiving from a user 202 an order for an item that may be transported by a carrier 240 from the materials handling facility 230 to a delivery location specified by the user 202, the electronic device 206 may send this information to the remote computing resources 210 over the network 208. As illustrated, the remote computing resources 210 may include one or more servers, such as servers 220(1), 220(2) . . . 220(N). These servers 220(1)-(N) may be arranged in any number of ways, such as server farms, stacks, and the like that are commonly used in data centers. Furthermore, the servers 220(1)-(N) may include one or more processors 222 and memory 224 that may store a delivery management system 226. The delivery management system 226 may be configured, for example, to perform order planning (e.g., at a materials handling facility 230) and/or scheduling of deliveries by carriers 240 to user specified delivery locations. In fulfilling orders that may be transported by a carrier 240, the materials handling facility 230 may fulfill orders using any of the processes discussed above with respect to FIG. 1.

The carriers 240 may communicate or otherwise interact with the remote computing resources 210 via the network 208. For example, the communications to and from the carriers 240 may be conducted utilizing electronic devices 246 (e.g., smart phones, laptops, tablets, personal digital assistants, netbooks, wearable or vehicle mounted cameras, etc.) of the carriers. The delivery management system 226 may also be configured, for example, to communicate with the carriers 240 and/or materials handling facility 230. In various implementations, the general activities of carriers 240, including those related to the travel of the carriers along delivery routes and the receiving and delivering of items by the carriers, may be recorded, monitored, coordinated, etc. by the delivery management system 226. For example, the delivery management system 226 may determine delivery routes and corresponding instructions that are provided to the carriers 240. As will be described in more detail below with respect to FIGS. 4-9, a visual route summary and/or other visual cues and instructions may be delivered to the electronic devices 246 of the carriers by one or more remote computing resources 210 and/or the delivery management system 226.

In various implementations, the remote computing resources 210 and/or the delivery management system 226 may also receive tracking data (e.g., GPS data) regarding the coordinates of the carriers 240. The GPS data may be utilized for various purposes, such as determining where route images have been acquired by a carrier and/or for providing delivery route visual cues and instructions that are relevant to a carrier's current location, as will be described in more detail below. In various implementations, such GPS data may also be utilized for answering location status requests, sending notifications regarding the current locations of the carriers, etc. For example, a user may request that a notification be sent when a carrier 240 with an ordered item is approaching. As another example, notifications may be sent to carriers 240 when they are approaching a delivery location. Notifications may also be sent from carriers 240 to the remote computing resources 210 and/or delivery management system 226 regarding various events (e.g., when a carrier has departed with items for delivery, when a carrier has delivered an item, when a carrier is approaching a delivery location, etc.).

In order to assist carriers with delivering items, some delivery companies are known to utilize "route books". Such route books have typically been in the form of physical pen-and-paper journals and/or printouts of corresponding textual descriptions. Types of information contained in such route books have included: preferred and maximum route durations; local road details (e.g., traffic, rush hour, road repair, construction, detours); customer locations and delivery instructions; open/close times; delivery time windows; fixed and variable service times; speed limits; turn-by-turn directions; simplified route maps; and textual descriptions of visual attributes. Such information has typically been manually collected by carriers over multiple traversals of the same delivery route.

In contrast to such physical pen-and-paper route books, in accordance with principles described herein, a system and method are provided for the automatic analysis of route data (e.g., including route images) for inclusion in a visual route book data set. The collection of the route data in a visual route book data set enables deriving and representing of contextual information for a delivery route in a form of a visual synopsis or summary of all the salient segments and associated visual cues of a delivery route. Visual attributes may be identified of all relevant geospatial entities that provide context for a route traversal, and such visual attributes may be stored and surfaced automatically (e.g., as part of a visual route summary that is provided to a carrier, based on a current position of a carrier, or based on a current step of a routing process, etc.).

As will be described in more detail below, such visual route book data sets have various advantages in that contextual data that is visual in nature can generally be more easily and comprehensively represented in the form of individual images and/or video sequences of images than in the form of textual descriptions. Individual images and video sequences of images also encapsulate enriched attributes of geospatial entities that may not be able to be represented in their entirety using words. In addition, visual information is generally known to be less subjective and more compact when represented by visual modalities rather than text. Such visual information may be collected, transmitted, and stored by electronic means. In addition, consuming visual information tends to take less time than its textual counterpart.

In various some implementations, all or part of the generation of a visual route book data set may be performed automatically. For example, salient segments of an egocentric video sequence of route images (e.g. from a camera worn by a carrier) may be automatically identified, segmented, tagged, and stored, either based on learned past observations or a set of rules, either of which may represent visual saliency factors that may be utilized for such purposes. In some instances, certain pieces of contextual information may include one or more images or video sequences of images that are manually collected, tagged, described and/or otherwise associated with a geospatial entity or route segment by a carrier or other individual. In various implementations, a resulting visual route book data set may be utilized to produce a visual summary that encapsulates salient or key components and steps of a delivery process. Through such methods, the key components of a delivery process (e.g., from the moment an item leaves a materials handling facility, through the routing and navigation, to the final delivery of the item to a user) may be turned into a short summary of visual guidance that can be quickly and easily interpreted.

As will be described in more detail below with respect to FIGS. 4-9, various processes may be performed with respect to the creation and utilization of visual route book data sets. For example, as will be described in more detail below with respect to FIG. 6, route images that are to be included in a visual route book data set may be determined by analyzing the route images based on certain visual saliency factors. As will be described in more detail below with respect to FIG. 7, a visual route summary may then be created by selecting important and relevant route images from a visual route book data set and utilizing those route images to create a compact and dynamic visual summary for the delivery route. In various implementations, the salient route images that are included in a visual route book data set may be both geospatially and temporally tagged, so as to enable storing, retrieving and composing of visual route summaries for future deliveries to a same delivery location or to delivery locations that share segments of the same delivery route. In various implementations, a visual route summary that is created may include a montage of route images and may act as a storyboard to guide a carrier along the delivery route, and may be particularly beneficial for assisting a carrier who is not familiar with a delivery location (e.g., at a particular address or in a particular neighborhood). In various implementations, certain visual route summaries may be considered to be generally egocentric in nature, in the sense that the visual route summary is represented from the viewpoint of the carrier that is delivering an item.

Figure 3:
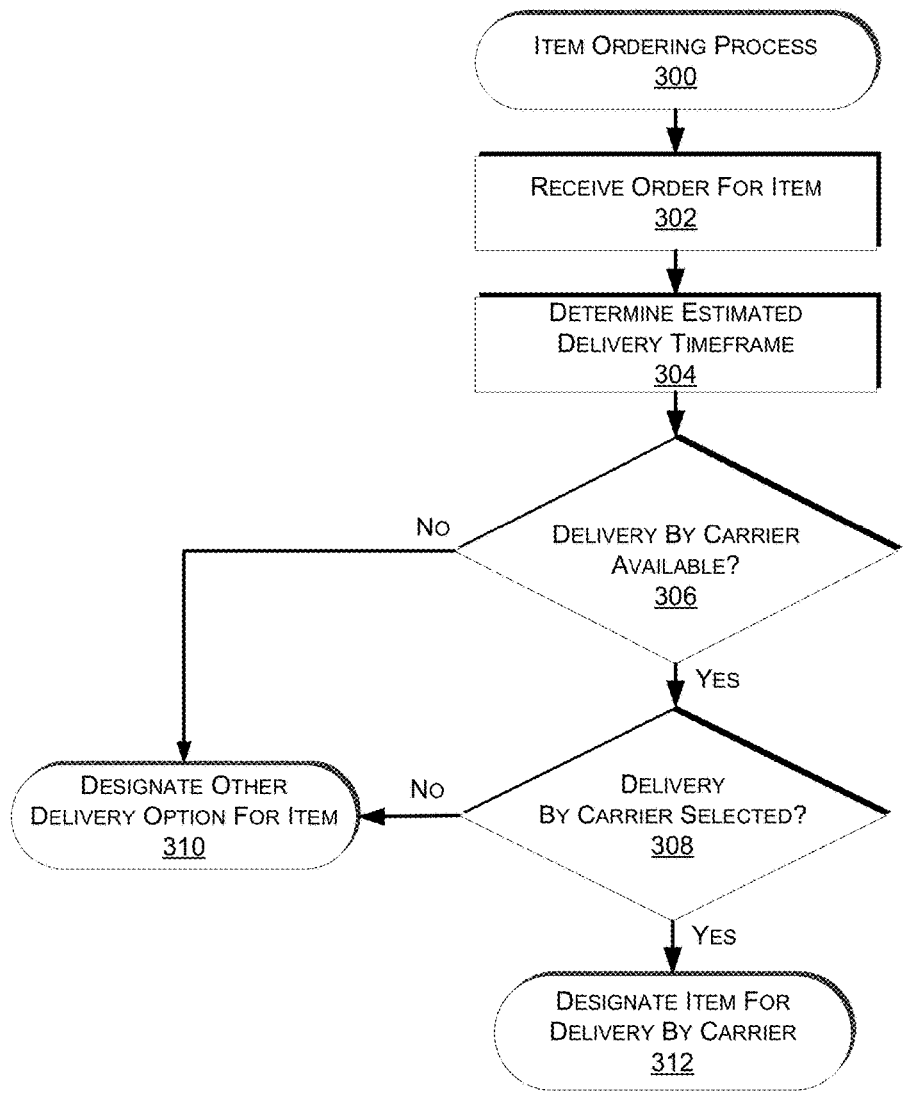
FIG. 3 is a flow diagram illustrating an example process for processing an order for an item, according to some implementations.

FIG. 3 is a flow diagram illustrating an example process 300 for processing an order for an item, according to some implementations. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 300 begins with the receipt of an order for an item, as in 302. Upon receiving the order for the item, a determination is made as to the estimated delivery timeframe for that item, as in 304. In some examples, this may include identifying a materials handling facility with the requested item in stock and estimating the time required to fulfill the item (e.g., to deliver the item to a user who placed the order). In other implementations, the estimated delivery timeframe may be a set day from the date of the purchase request or a series of days. For example, a user may specify that the delivery timeframe is to be one day from the date of purchase request or between three and five days from the date of the purchase request. In still other implementations, the estimated delivery timeframe may be a set day of the week upon which a user has requested to have items delivered. For example, a user may preselect to have items that are ordered during the week to be delivered on Thursday of every week.

After the estimated delivery timeframe is determined, a determination is made as to whether a carrier is available to deliver the item to the specified delivery location (e.g., at a delivery address of a user's home, office, etc.), as in 306. In various implementations, different types of carriers may be utilized for transporting items to delivery locations (e.g., delivery associates, automated machines, etc.) If it is determined that delivery by carrier is available, a determination is made as to whether delivery by carrier is selected, as in 308. In various implementations, an interaction may be received from a user through a user interface that presents delivery options to the user and receives a selection from the user (e.g., for selecting delivery by a carrier or other delivery option). In addition, in various implementations a user may preselect or provide a preference for deliveries by carriers or other delivery options. If delivery by carrier is not selected, as in 308, or if no carrier is available to make the delivery, as in 306, another delivery option is designated for the delivery of the item, as in 310. For example, another delivery option may include a self-service pickup of an item (e.g., from a pickup location, materials handling facility, retail facility, etc.). If delivery by carrier is selected, the item is designated for delivery by carrier, as in 312.

Figure 4:
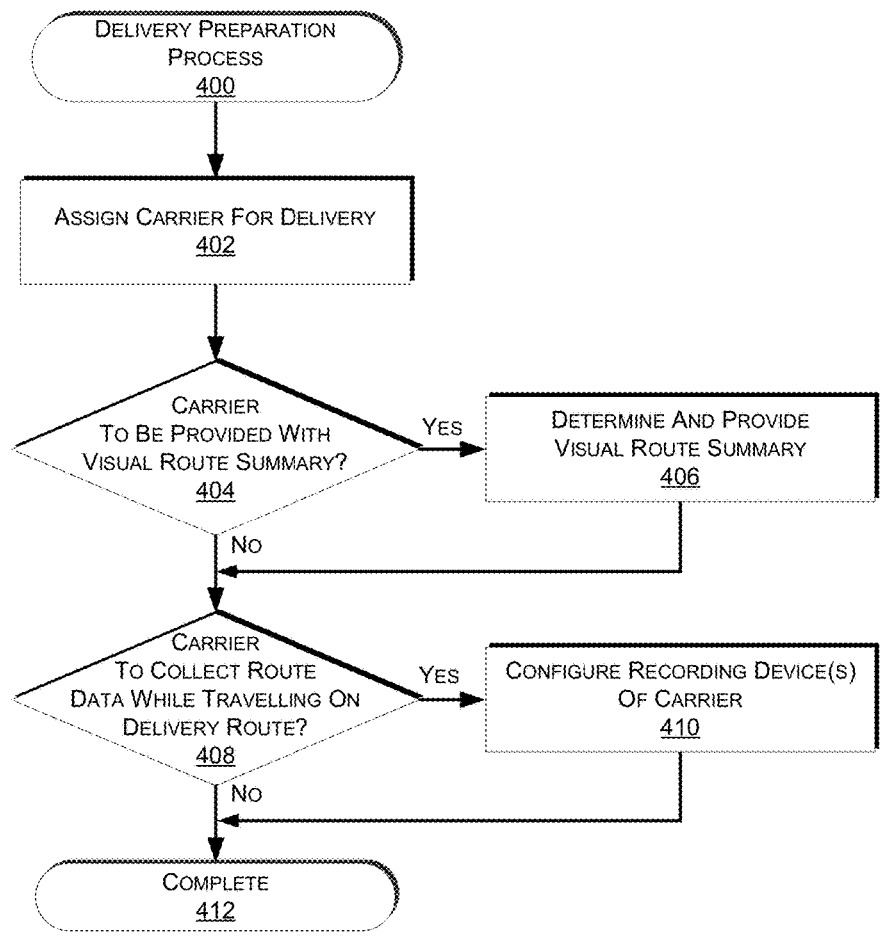
FIG. 4 is a flow diagram illustrating an example process for preparing for a delivery of an item, according to some implementations.

FIG. 4 is a flow diagram illustrating an example process 400 for preparing for a delivery of an item by a carrier, according to some implementations. The example process begins with an assignment of a carrier for a delivery, as in 402. In various implementations, a carrier may be assigned based on carrier availability and/or a delivery route being within a region that the carrier works in. Once the carrier has been assigned, a determination is made as to whether the carrier is to be provided with a visual route summary, as in 404. If the carrier is to be provided with a visual route summary, a visual route summary is determined and provided, as in 406. As will be described in more detail below with respect to FIG. 7, a determination of a visual route summary may include selecting route images and associated information from a visual route book data set, wherein the selected route images may represent certain salient transitions and/or stops, etc. and associated visual cues along a delivery route. As will also be described in more detail below, visual route summaries may be updated based on various factors (e.g., based on carrier feedback, changes in delivery routes, etc.), and updated versions may be presented to carriers while on delivery routes or at other times (e.g., prior to starting a delivery route).

In addition to providing a visual route summary, as in 406, or if a visual route summary is not to be provided, as in 404, a determination is made as to whether the carrier is to collect route data while travelling along the delivery route, as in 408. If the carrier is to collect route data, various recording devices of the carrier are configured for collecting the route data, as in 410. In various implementations, different types of recording devices may be utilized by carriers. For example, some carriers may have cell phones that may be utilized as recording devices and/or may be provided with wearable cameras, etc. (e.g., attached to a helmet, uniform, etc.) Such recording devices may be configured to record on a continuous basis during the delivery route, or at relevant times (e.g., at the beginning of a route, during salient transitions along the route, when activated by the carrier, etc.). Such recording devices may also be positioned in various ways (e.g., as mounted on a front or back of a vehicle, attached on a front or back of a helmet or uniform, etc.). Once the recording device(s) of the carrier have been configured, as in 410, or once it has been determined that the carrier will not collect route data, as in 408, the example process completes, as in 412.

Figure 5:
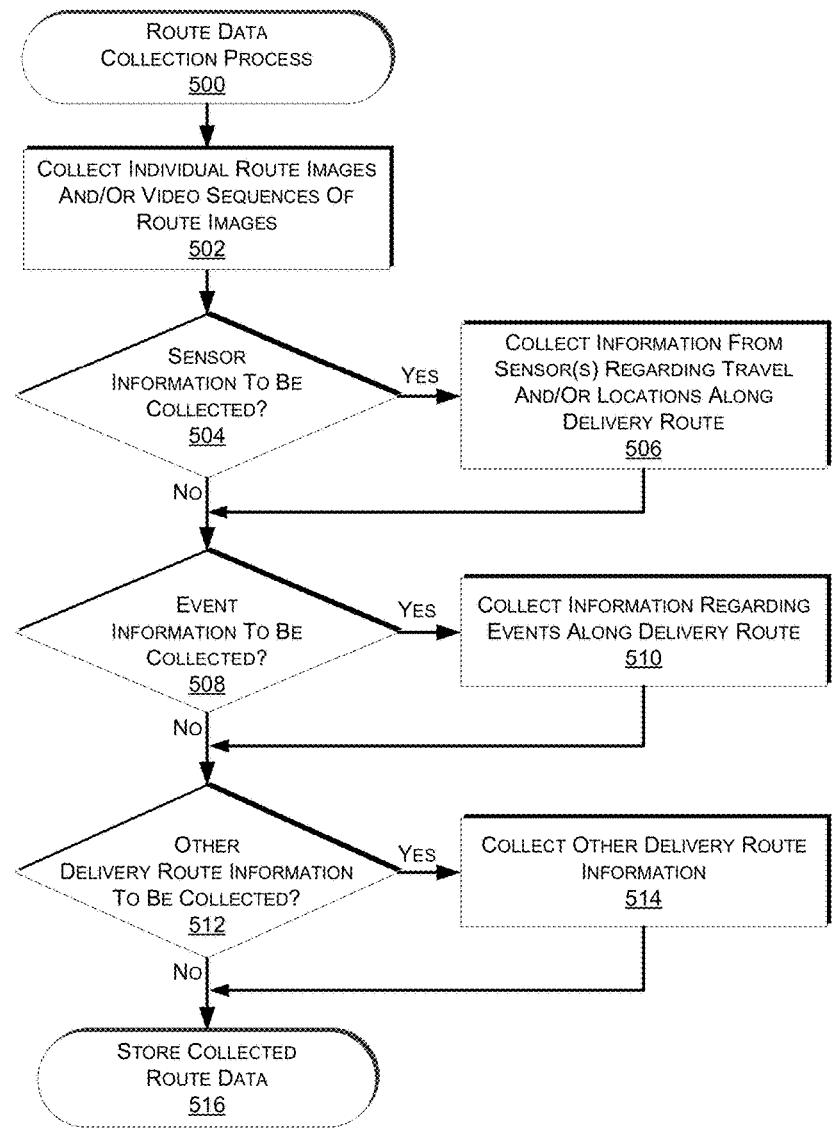
FIG. 5 is a flow diagram illustrating an example process for collecting route data including route images, according to some implementations.

FIG. 5 is a flow diagram illustrating an example process 500 for collecting route data, according to some implementations. The example process begins with a collection of individual route images and/or video sequences of route images, as in 502. In various implementations, such route images may be received from various sources. For example, as described above with respect to FIG. 4, a carrier or other individual (e.g., a user who has ordered an item, etc.) may carry and/or otherwise utilize a recording device (e.g., a cell phone, a video camera, a wearable camera, a vehicle mounted camera, etc.) for acquiring route images at various locations along a delivery route. Videos acquired with a recording device (e.g., a video camera, etc.) are referenced herein as a video sequence of route images. In various implementations, at least some of the route images that are collected (e.g., either individually or as video sequences of route images) may represent changes in direction, speed, mode of transportation, etc. along a delivery route. In addition, some route images may include certain objects, structures, etc. that may correspond to locations where certain changes along the delivery route occur. In some instances, route images may represent route segments that require a carrier to utilize a different mode of transportation (e.g., inside a building or other structure where a carrier is required to navigate on foot as part of the delivery route). For route images acquired inside a structure, various objects may be included that relate to the navigation by the carrier (e.g., a doorway, a stairway, an elevator, a front counter, a reception desk, etc.) As will be described in more detail below, in various implementations such route images may be stored along with corresponding information (e.g., stored as metadata with the route images). For example, such information may indicate "right turn at the stop sign", "stop at the red brick tudor", "enter through the gate in the white picket fence", "stop at the third yellow craftsman house", "walk down the gravel road", "park in the 30 minute loading zone", "walk to the red door", or "approach silver reception desk" with the associated route images showing the objects/structures that are described.

In various implementations, it may be desirable to capture route images on a regular basis, in that various changes may occur with respect to the presence or appearance of certain salient objects and/or features. For example, over time buildings may have different appearances (e.g., different paint colors, etc.), different decorations may be provided for different holidays, lighted areas may have different appearances during daylight hours versus evening hours, etc. In various implementations, by obtaining and analyzing updated route images, such changes in saliency may be captured, analyzed and recorded. For example, carriers who regularly travel along delivery routes may utilize recording devices (e.g., wearable cameras, vehicle mounted cameras, etc.) to regularly record such route images (e.g., on different dates and at different times). Such route images may be analyzed and stored as part of updates to visual route book data sets, as will be described in more detail below.

In addition to the collection of route images, a determination is made as to whether sensor information is also to be collected, as in 504. If sensor information is also to be collected, information is collected from sensors regarding travel and/or locations along the delivery route, as in 506. In various implementations, information may be received from different types of sensors. For example, information may be received from positioning, velocity and acceleration sensors (e.g., GPS, gyros, accelerometers, etc.) that are carried by carriers or attached to vehicles that are driven by carriers. As will be described in more detail below, such collected sensor information may include location information or may otherwise be utilized to determine locations where route images were acquired, etc.

In addition to the collection of information from sensors, as in 506, or if it is determined that sensor information is not to be collected, as in 504, a determination is made as to whether information regarding events is to be collected, as in 508. If event information is to be collected, information is collected regarding events along the delivery route, as in 510. In various implementations, certain types of events may correspond to actions of a carrier. For example, such events may correspond to package scans, indications or confirmations of various delivery process steps by a carrier, requests for routing assistance by a carrier, a carrier getting into or out of a vehicle, an opening of a vehicle door, a turning on or off of an ignition key, activation of a turn signal or hazard lights, applying brakes, etc. It will be appreciated that such events may in some instances be determined by certain types of devices (e.g., a package scanner, sensors included as part of a vehicle's computing system, etc.).

In addition to the collecting of information regarding events, as in 510, or if no event information is to be collected, as in 508, a determination is made as to whether other delivery route information is to be collected, as in 512. If other information is to be collected, other information that is relevant to the delivery route is collected, as in 514. In various implementations, different types of additional information may be collected. For example, such additional information may include contextual directions in the form of visual cues or navigational aids (e.g., as provided by a carrier, user, etc.) In one implementation, a carrier or other individual may provide instructions and/or feedback related to route images indicating information such as where to stop, where to park, where to walk, etc. As another example, location information may be provided by a carrier or from another source which indicates a location along a delivery route where an associated route image was acquired. As another example, a carrier may provide markings, annotations, selections, etc. regarding route images and various objects included therein (e.g., indicating visual cues that a carrier has found helpful for assisting with navigation along the delivery route). Once the other delivery route information has been collected, as in 514, or if no other delivery route information is to be collected, as in 512, any route data that has been collected is stored, as in 516. In various implementations, the collected route data may be stored in different ways and/or in different locations. For example, route data may be stored on a carrier's mobile device, at a centralized control system, at a remote computing resource and/or may be divided or otherwise distributed across such devices or systems.

Figure 6:
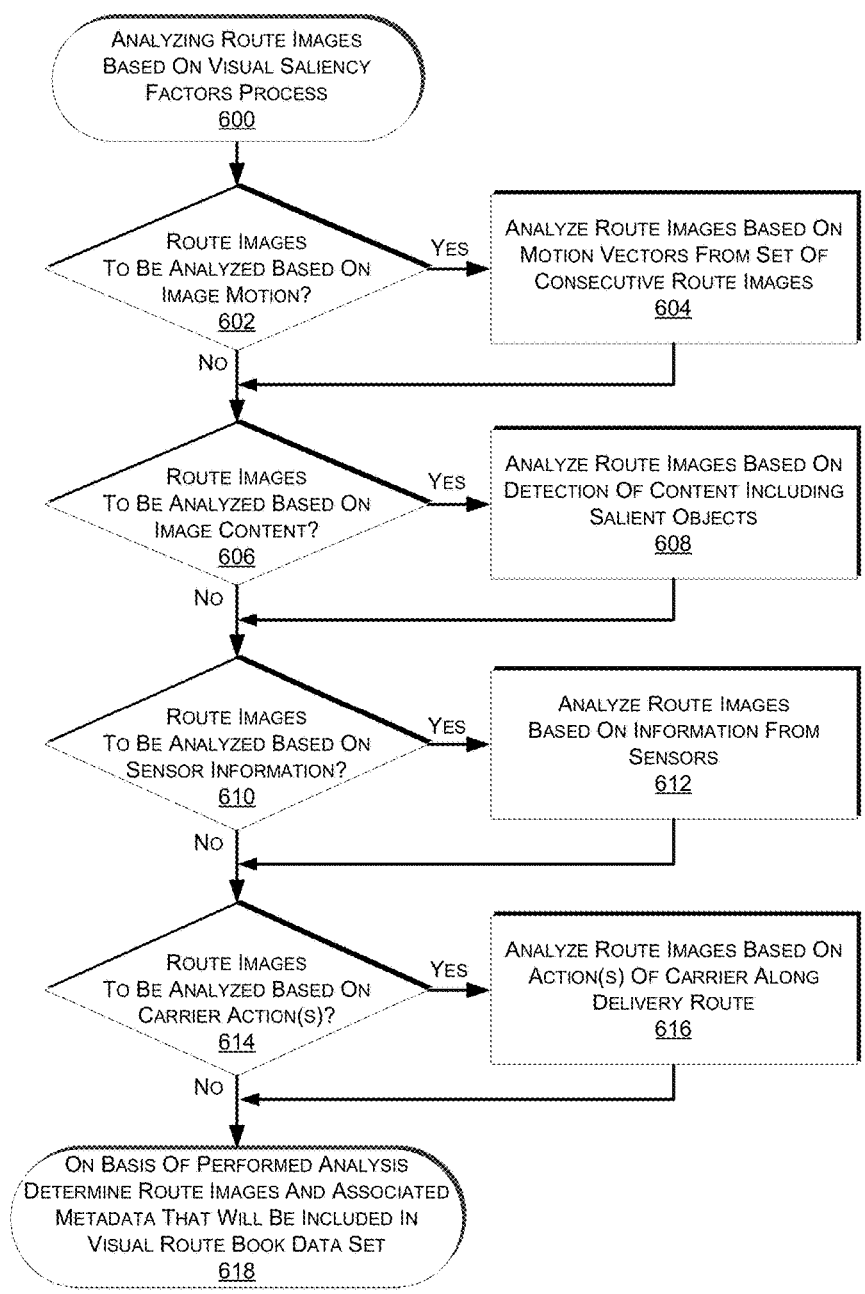
FIG. 6 is a flow diagram illustrating an example process for analyzing route images based on visual saliency factors, according to some implementations.

FIG. 6 is a flow diagram illustrating an example process 600 for analyzing route images based on visual saliency factors, according to some implementations. The example process begins with a determination as to whether the route images are to be analyzed based at least in part on image motion, as in 602. If the analysis is to be based at least in part on image motion, the analysis is performed based at least in part on a determination of motion vectors from a set of consecutive route images, as in 604. In various implementations, such motion vectors from a set of consecutive route images (e.g., either acquired as individual route images or as a video sequence of route images) may be utilized for determining an optical flow and corresponding relative movements (e.g., of a recording device such as a wearable camera that was used for acquiring the images). Various examples of such movements that may be determined to correspond to route images may include moving forward, stopping, turning right, turning left, veering right, veering left, etc. In various implementations, such movement classification may be based on classifying ego-motion (e.g., from the perspective of the carrier) utilizing optical flow (e.g., with a support vector machine (SVM)).

In addition to analyzing the route images based at least in part on image motion, as in 604, or if no analysis is to be based on image motion, as in 602, a determination is made as to whether the route images are to be analyzed based at least in part on image content, as in 606. If the analysis is to be based at least in part on image content, the route images are analyzed based at least in part on a detection of content or changes in content including salient objects, as in 608. In various implementations, such content may be detected by using computer vision recognition and/or classification algorithms. Various examples of such salient objects may include stop signs, yield signs, traffic lights, road intersections, mailboxes, doors, gates, parking signs, dock entrances, garage doors, structures, stairs, any other signs with text or known symbols, etc. In some instances, such salient objects that are detected in route images may correspond to locations along a delivery route where transitions and/or stops occur, or may represent obstacles or structures along the delivery route that a carrier is required to navigate through or around, etc. In various implementations, changes may also occur with respect to the presence or appearance of certain salient objects. For example, changes may occur with regard to a delivery location (e.g., outdoor/seasonal decorations, changes to paint color, other exterior changes, etc.) or along a delivery route (e.g., changes to signs, new signs, removed signs, changed traffic patterns, etc.). By analyzing the content of associated route images (e.g., including comparing the route images to previously acquired route images at similar locations), objects which represent such changes may be detected. On the basis of such changes, the associated route images may be determined for inclusion in a visual route book data set (e.g., as an updated route image, or as representing a location at a particular time of day, etc.), as will be described in more detail below.

In addition to analyzing the route images based at least in part on image content, as in 608, or if no analysis is to be based on image content, as in 606, a determination is made as to whether the route images are to be analyzed based at least in part on sensor information, as in 610. If the analysis is to be based at least in part on sensor information, the route images are analyzed based at least in part on information from sensors, as in 612. In various implementations, information may be received from different types of sensors as described above with respect to FIG. 5. For example, different types of positioning, velocity and acceleration sensors (e.g., GPS, gyros, accelerometers, etc.) may be carried by carriers, attached to carrier vehicles, etc. In an implementation where GPS coordinates are received, such location information (e.g., as associated with route images) may correspond to specific intersections, turns, exits and entrances to freeways, parking locations, and/or points off a vector road network, etc. In an implementation where sensor information regarding velocity profiles is received, such may correspond to stops and starts of movement.

In addition to analyzing the route images based at least in part on sensor information, as in 612, or if no analysis is to be based on sensor information, as in 610, a determination is made as to whether the analysis is to be based at least in part on carrier actions, as in 614. If the analysis is to be based at least in part on carrier actions, the route images are analyzed based at least in part on actions of the carrier along the delivery route, as in 616. In various implementations, different types of actions may be performed by a carrier while on a delivery route. For example, such carrier actions may correspond to package scans, getting into or out of a vehicle, opening a vehicle door, turning on or off an ignition key, applying brakes, etc. It will be appreciated that in certain implementations such carrier actions may be determined by various types of devices (e.g., a package scanner, sensors included as part of a vehicle's computing system, etc.).

In addition to analyzing the route images based on carrier actions, as in 616, or if no analysis is to be based on carrier actions, as in 614, on the basis of the analysis that has been performed, route images and associated metadata are determined for inclusion in a visual route book data set, as in 618. More specifically, on the basis of the analysis that has been performed, a determination is made as to whether each route image will or will not be included in the visual route book data set. In various implementations, the route images and associated metadata (e.g., related to visual cues and other salient objects or features) that are to be included may be stored as part of the visual route book data set in different ways and/or in different locations. For example, the route images and associated metadata of the visual route book data set may be stored on a carrier's mobile device, at a centralized control system, at a remote computing resource and/or may be divided or otherwise distributed across such devices or systems.

In various implementations, the metadata to be included in the visual route book data set may correspond to instructions and/or information for a carrier as associated with certain route images. It will be appreciated that the included route images and metadata may be representative of various route-specific details that may not be part of any gazetteer, publicly-available, or geospatial data provider databases. Many details may be contextual in the sense that they are specific to the delivery route and contain enriched attributes of geospatial entities (e.g., streets, intersections, houses, buildings, parking lots, garages, neighborhoods, detours, short cuts, etc.), all of which provide local context.

In various implementations, an optimization function may be utilized as part of the determination for which route images will be included in the visual route book data set. For example, such an optimization function may take into account the analysis that is performed based on each of the visual saliency factors (e.g., based on one or more of image motion, image content, sensor information, carrier actions, etc.). In one implementation, the optimization function may determine saliency scores that are based on individual analysis and/or selected weightings of the analysis and may determine route images for inclusion in the visual route book data set that have the highest scores and/or scores that are above a determined threshold.

For example, a route image that is determined to correspond to a certain type of change (e.g., in direction, speed, mode of transportation, etc.) along a delivery route (e.g., as determined by one or more of the visual saliency factors) may be indicated as having a higher visual saliency score than another route image that does not correspond to such a change. For example, a first route image of a first traffic light where "turning right" is determined to occur may correspond to a higher visual saliency score than a second route image of a second traffic light where no turn is determined to occur. In this specific illustrative example, on the basis of the different visual saliency scores, the first route image may be determined for inclusion in a visual route book data set, while the second route image may not.

As another example, a route image that is determined to include a salient object (e.g., as determined by an analysis based on image content) may be indicated as having a higher visual saliency score than another route image that does not include a salient object or which includes a less salient object. For example, if multiple route images are acquired at a stop at a parking location, and if a first route image is determined to include a salient object at the parking location (e.g., a parking sign indicating allowable parking times), the first route image may correspond to a higher visual saliency score than a second route image that is determined to include a less-salient object (e.g., a tree next to the parking location that is surrounded by similar trees). In this specific illustrative example, the first route image including the parking sign may be determined to have a sufficient visual saliency score for inclusion in a visual route book data set, while the second route image including the tree may not.

It will be appreciated that such analysis and/or visual saliency scores may be based on combinations of visual saliency factors. For example, the determination that the carrier had stopped at the above described parking location may have been made in accordance with an analysis based on one or more other visual saliency factors (e.g., image motion, sensor information, and/or carrier actions). As another example, if the route image of the parking sign had not been taken at a stopping point along a delivery route (e.g., if it instead had been recorded from a moving carrier vehicle that was just passing by), it correspondingly would not have represented a stopping location. In such an instance, even though the analysis based on image content may have determined the presence of the parking sign, the additional analysis (e.g., based on image motion, sensor information and/or carrier actions) would have indicated that the image did not correspond to a stopping location along a delivery route. In such a case, the route image of the parking sign may be determined to correspond to a lower visual saliency score, for which the route image may not be determined for inclusion in a visual route book data set.

In various implementations, certain additional types of analysis may be performed with respect to route images. For example, a delivery location (e.g., corresponding to a specific address) may be automatically detected and/or recognized based on an analysis of received route images. In one implementation, individual route images and/or video sequences of route images acquired during multiple deliveries to a same delivery location may be utilized for deriving a set of visual characteristics (e.g., a visual signature) of the delivery location. Such a set of visual characteristics may allow the delivery location to be automatically recognized based on acquired route images (e.g., without requiring GPS or other sensor information for otherwise determining a current carrier location, etc.).

As another example, an automatic time study of a delivery route may be performed based on visual recognition of route images. In one implementation, a video sequence of route images (e.g., collected from a dashboard camera, wearable camera, etc.), may be utilized for detecting and labeling salient objects that correspond to specific time instances along a delivery route. Multiple video sequences of route images for the same delivery route to a delivery location may be utilized for identifying and aggregating salient objects and a time sequence of when those salient objects appear along the delivery route. Such determined timings may be indicated in metadata that is stored with the corresponding route images in a visual route book data set. Such timing information may be utilized to help inform a carrier as to the expected timings along each segment of a delivery route, and/or to determine or evaluate the progress of a carrier. As another aspect, if a variable condition is known to occur (e.g., a gate along the delivery route that is sometimes locked or unlocked), timings which correspond to the variable condition (e.g., the route traversal when the gate is either locked or unlocked) may be determined. Such timings based on variable conditions may be utilized to update an expected timing for a delivery route, identify an alternate route for the delivery, etc.

Figure 7:
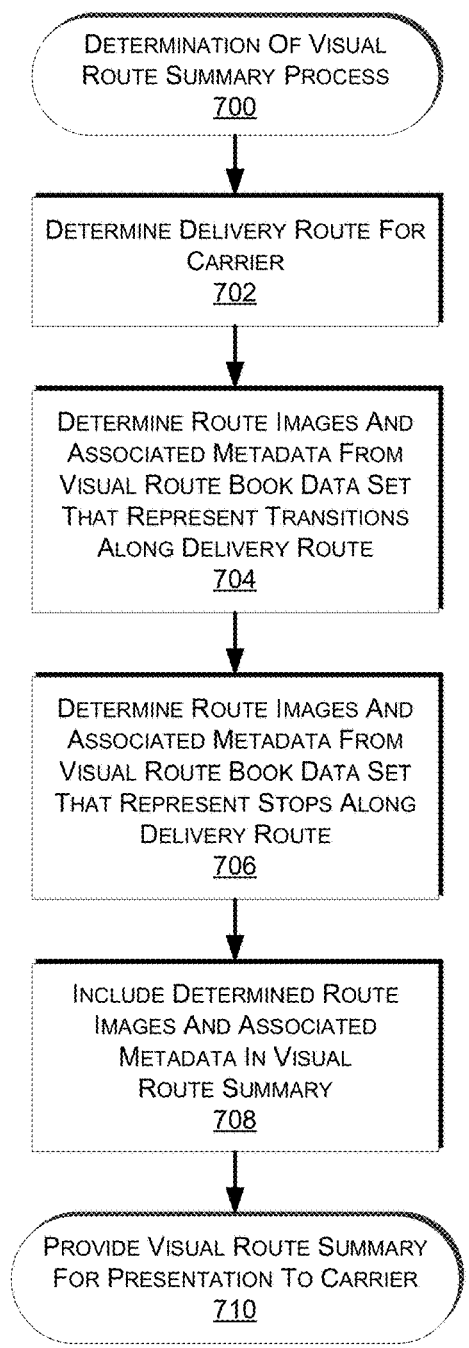
FIG. 7 is a flow diagram illustrating an example process for determining a visual route summary, according to some implementations.

FIG. 7 is a flow diagram illustrating an example process 700 for determining a visual route summary, according to some implementations. The example process begins with a determination of a delivery route for a carrier for delivering items to delivery locations, as in 702. In various implementations, delivery routes may be determined in different ways. For example, routing software and/or algorithms may be utilized for determining a delivery route. As another example, a previously established delivery route may be utilized. Once the delivery route for the carrier has been determined, route images and associated metadata from the visual route book data set are determined that represent transitions along the delivery route, as in 704. For example, route images and associated metadata representing locations along the delivery route where transitions occur due to turns, exits, ramps, traffic conditions, detours, speed limit signs, school zones, other neighborhood details, etc. may be determined for inclusion in a visual route summary.

Once the route images and associated metadata that represent transitions have been determined, route images and associated metadata from the visual route book data set are determined that represent stops along the delivery route, as in 706. For example, route images and associated metadata representing parking locations and delivery locations, as well details about receptionists, concierges, customer availability times, service times, placement locations, storage areas, entrances, parking times, route segments between parking locations and delivery locations, etc. may be determined for inclusion in the visual route summary.

Once the route images and associated metadata that represent stops have been determined, all of the determined route images and associated metadata are included as part of the visual route summary, as in 708. In various implementations, the determined route images and associated metadata may be stored as part of the visual route summary in different ways and/or in different locations. For example, the route images and associated metadata of the visual route summary may be stored at a carrier's mobile device, at a centralized control system, at a remote computing resource and/or may be divided or otherwise distributed across such devices or systems.

In some instances, associated metadata may be included as part of the visual route summary in the form of instructions that are determined from the metadata and which are related to at least some of the selected route images. For example, an instruction may indicate an action related to a structure or object, and may include a visual description of the structure or object (e.g., indicating a color, shape, etc.) Examples of such instructions may include "stop at red brick tudor" or "enter through the gate in the white picket fence", where the corresponding route image may include the red brick tudor or the white picket fence (e.g., which may represent visual cues that are emphasized or otherwise indicated in the route images, as will be described in more detail below with respect to FIG. 9). In various implementations, the selected route images and associated metadata may be sequenced and organized as a cohesive presentation as part of the visual route summary. For example, the visual route summary may be presented as a visual storyboarding or playback in the form of a video sequence of route images or individually presented route images that represent the transitions and stops along the delivery route. Once the selected route images and associated metadata have been included as part of the visual route summary, the visual route summary is provided for presentation to the carrier to assist the carrier in navigating along the delivery route, as in 710.

In various implementations, presentations of visual route summaries (or other presentations as will be described in more detail below with respect to FIG. 8) may include providing route images with salient visual cues (e.g., such as the red brick tudor or the white picket fence noted above). As another example, in an instance where a large sign for a store is at a right-side corner of an intersection where a carrier is to turn right as part of a delivery route, a route image including the sign may be presented to the carrier, with the sign emphasized as a visual cue within the route image. Alternatively, if a different carrier is approaching the same intersection but instead needs to make a left turn as part of a delivery route, a lamppost at the left-side corner of the intersection may be emphasized as a visual cue in the route image for guiding the carrier. As illustrated by these examples, within a given route image, different items may be emphasized as visual cues depending on the intended routing guidance to be presented to the carrier for navigating along a delivery route. As another example, in an instance where a route image includes two buildings which share a common entry courtyard between them, one building or the other may be emphasized as a visual cue within the route image, depending on the delivery route that the carrier is being guided along. Such emphasizing of objects as visual cues in route images will be described in more detail below with respect to FIG. 9.

In various implementations, a visual route summary that is determined remotely (e.g., by a delivery management system, a remote computing resource, etc.) may be provided (e.g., downloaded, transmitted, etc.) to a carrier's mobile device for being presented to the carrier. In other implementations, if the visual route summary is determined locally (e.g., on a carrier's mobile device), the corresponding route images and metadata of the visual route summary may be provided from the memory of the mobile device to a user interface of the mobile device for being presented to the carrier. In various implementations, the format and other characteristics of the presentation of the route images and associated metadata on a user interface of a carrier's device may depend on various factors. For example, a carrier may indicate preferences for more or less detail in presentations, relative speeds or durations of presentations, use of audio versus text, etc. In various implementations, a current direction of movement and/or speed of the carrier may influence the characteristics of the presentation (e.g., such as a determination that a carrier has more time to view a presentation when the carrier is parked as compared to when the carrier is driving, etc.). In various implementations, portions of a visual route summary that are relevant to a current location of a carrier may be provided and/or presented to the carrier, as will be described in more detail below with respect to FIG. 8.

In various implementations, a carrier or other individual may also be able to provide feedback with regard to a visual route summary (or in regard to other route images included in a visual route book data set, etc.). For example, if a carrier determines that a visual route summary has certain errors or omissions (e.g., does not accurately represent a portion of the delivery route, or otherwise causes a carrier to become confused or lost, etc.), the carrier may provide feedback regarding the issues with the route summary. In certain instances, the feedback may be in the form of comments, corrections, new route images, identifications of more helpful visual cues in route images, etc. It will be appreciated that new route images provided by a carrier may both convey feedback and may also be analyzed for inclusion in a visual route book data set which may be the basis for future improved visual route summaries that are presented to other carriers. It will be appreciated that in this manner, visual route book data sets and visual route summaries may be improved and updated in accordance with feedback from carriers.

Figure 8:
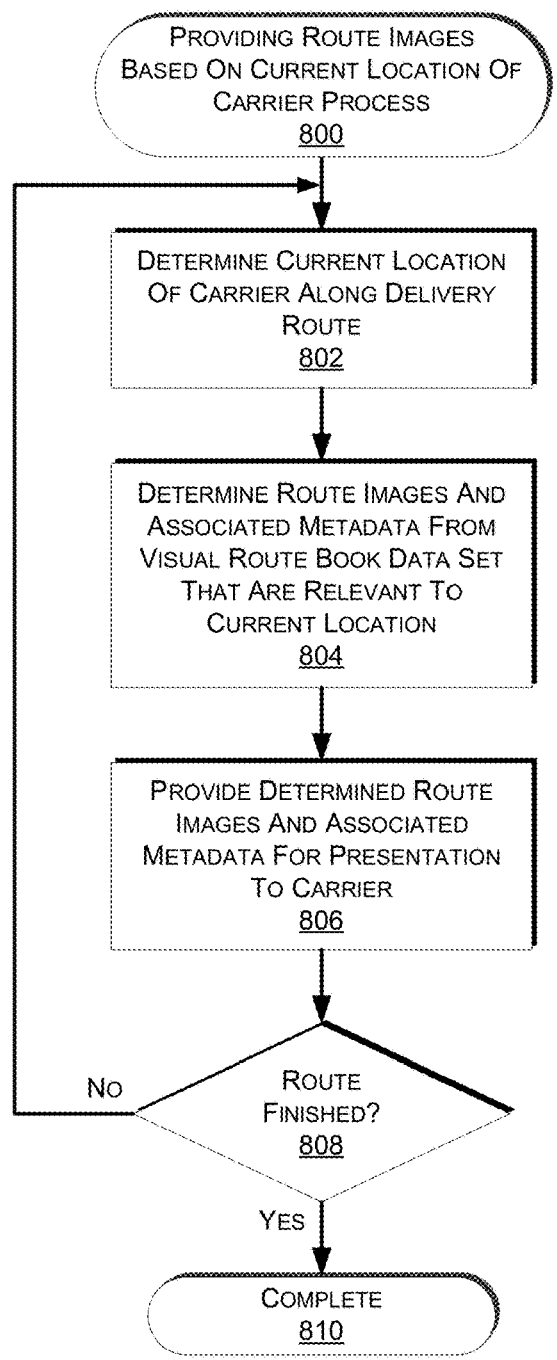
FIG. 8 is a flow diagram illustrating an example process for providing route images based on a current location of a carrier, according to some implementations.

FIG. 8 is a flow diagram illustrating an example process 800 for providing route images based on a current location of a carrier, according to some implementations. The example process begins with a determination of a current location of a carrier along a delivery route, as in 802. In various implementations, a current location of a carrier may be determined in different ways. For example, a GPS location of a carrier's mobile device may be determined. As another example, a current image (e.g., from a wearable camera that is carried by the carrier) may be analyzed (e.g., as compared to stored images of the delivery route) to determine a current location of the carrier. As another example, carrier actions that are performed along a delivery route (e.g., package scans, etc.) may be utilized to determine a carrier's location. For example, a package scan performed for delivering an item to a delivery location may be utilized for determining that the carrier is at the particular delivery location along the delivery route. It will be appreciated that in regions with limited infrastructure (e.g., limited network and/or GPS access, unnamed roadways, etc.), such techniques may be particularly advantageous for determining a current location of a carrier along a delivery route. In various implementations, other related position information (e.g., indicating a speed, direction of movement, etc.) of the carrier may also be analyzed as part of the determination of the carrier's current location.

Once the current location of the carrier is determined, route images and associated metadata from the visual route book data set are determined that are relevant to the current location, as in 804. In various implementations, route images and associated metadata may be stored as corresponding to specific locations, and may be recalled in reference to a current location. In an instance where route images and associated metadata from the visual route book data set have previously been included in a visual route summary (e.g., as described above with respect to FIG. 7), the route images and associated metadata that are relevant to the current location may be selected from the visual route summary. In various implementations, other factors may also influence the determination of the relevant route images and metadata. For example, a current speed and/or direction of movement of the carrier may influence the determination of the route images and associated metadata that are relevant to the carrier's current location.

Once the route images and associated metadata that are relevant to the carrier's current location have been determined, the determined route images and associated metadata are provided for presentation to the carrier, as in 806. For example, as described above with respect to FIG. 7, route images and associated metadata may be presented on a user interface of a carrier's mobile device. In various implementations, a carrier may request to have route images and associated metadata that are relevant to a current location presented (e.g., if the carrier is lost and is trying to regain bearings, if the carrier prefers regular navigation updates, etc.). In various implementations, such route images and associated metadata that are relevant to a current location may be provided at regular intervals as part of normal operating procedures and/or may be automatically provided under various circumstances (e.g., if changes occur to a delivery route, etc.). Once the determined route images and associated metadata have been provided for presentation to the carrier, a determination is made as to whether the route is finished, as in 808. If the route is not finished, the example process returns to block 802, and if the route is finished, the example process completes, as in 810.

Figure 9:
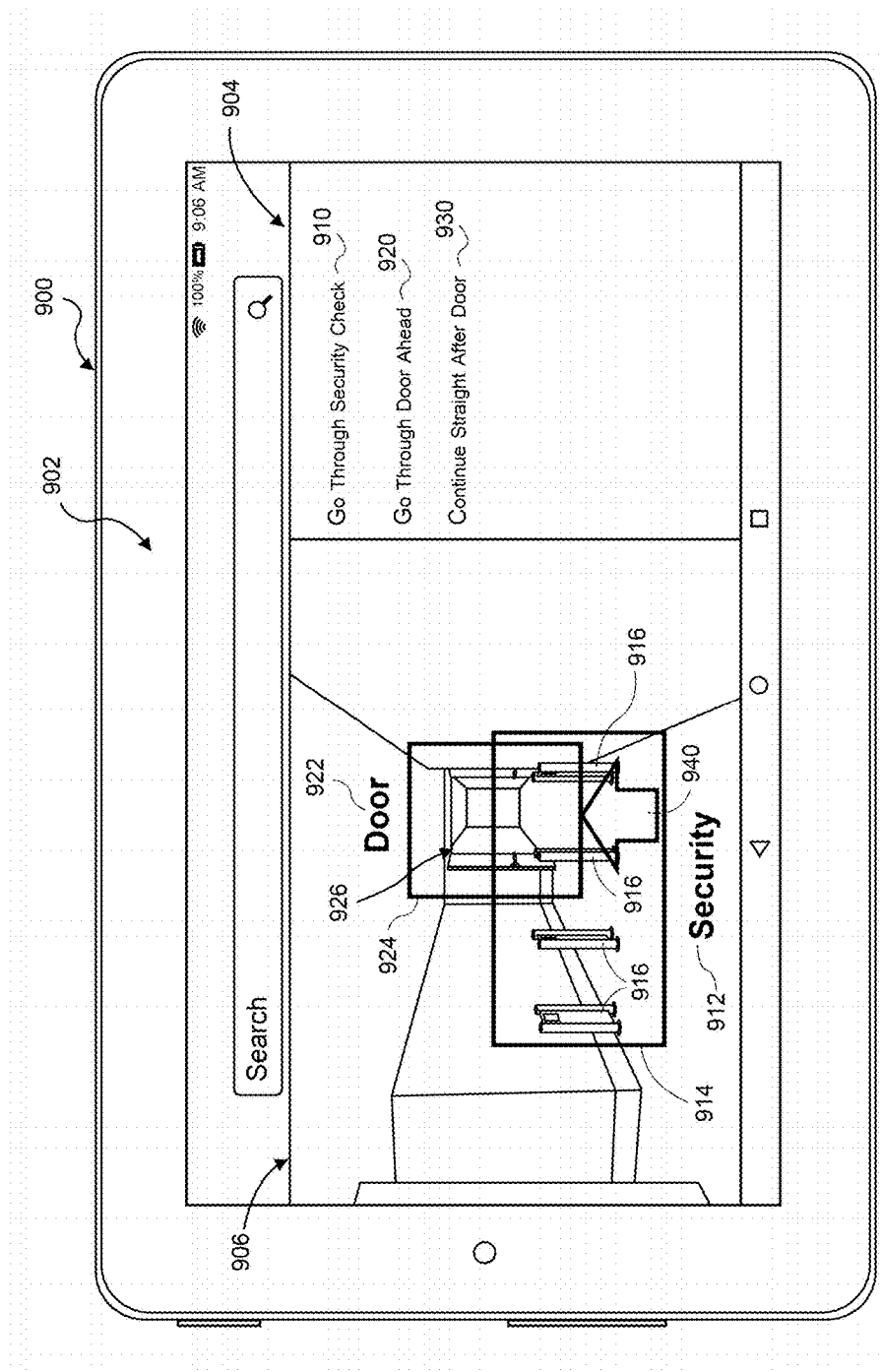
FIG. 9 is a block diagram of an example electronic device with a user interface including a route image, according to some implementations.

FIG. 9 is a block diagram of an example electronic device 900 with a user interface 902 including a route image 906, according to some implementations. In various implementations, the electronic device 900 may be similar to the electronic device 246 described above with respect to FIG. 2. In various implementations, the user interface 902 may be a graphical user interface, a multi-mode interface, or any other interface for displaying route images and interacting with a carrier or other user. The user interface 902 may be provided through any type of electronic device 900, such as a tablet, desktop, laptop, smart phone, personal digital assistant, netbook, etc.

On the right-hand side of the user interface 902, an instruction area 904 includes a series of textual instructions for guiding a carrier along a delivery route. More specifically, an instruction 910 indicates that the carrier is to first "Go Through Security Check". Then, an instruction 920 indicates that the carrier is to "Go Through Door Ahead". Then, an instruction 930 indicates that the carrier is to "Continue Straight After Door". In various implementations, such instructions may be provided in various ways (e.g., textually, verbally, etc.).

With respect to the instructions 910 and 920, the route image 906 is shown to include a group of security check posts 916 and a door 926, which are each emphasized as visual cues. More specifically, the security check posts 916 are emphasized as visual cues by an emphasis element 912 (i.e., a label "Security") and an emphasis element 914 (i.e., a box surrounding the security check posts 916). An emphasis element 940 (i.e., a large arrow) also indicates that the carrier is to walk between the security check posts 916. In this instance, the emphasis of the security check posts 916 as visual cues is related to the instruction 910, for which the carrier is to "Go Through Security Check". The door 926 is emphasized as a visual cue by an emphasis element 922 (i.e., a label "Door") and an emphasis element 924 (i.e., a box surrounding the door 926). In this instance, the emphasis of the door 926 as a visual cue is related to the instruction 920, for which the carrier is to "Go Through Door Ahead". In various implementations, in addition to the types of emphasis elements 912, 914, 922 and 924 illustrated in FIG. 9, other types of emphasis elements and/or techniques may also or alternatively be utilized (e.g., highlighting, circling, arrows, blinking indicators, changing colors, etc.).

As described above, in various implementations route images may be provided from various sources (e.g., a carrier travelling along a delivery route, a user who has ordered an item, etc.). The route images may be analyzed (e.g., utilizing content analysis, or according to various markings or comments provided by carriers, etc.) to identify visual cues (e.g., the security check posts 916 and the door 926) associated with a delivery route (e.g., the delivery route indicated by the instructions 910-930). Such route images and associated visual cues may be recorded in a visual route book data set. Such route images from the visual route book data set may later be determined as corresponding to one or more locations along a delivery route (e.g., and as including visual cues that are identified based at least in part on the delivery route). Such determined route images may be provided for presentation to a carrier to assist the carrier in navigating along the delivery route, and the visual cues may be indicated to the carrier in the provided route images (e.g., such as the security check posts 916 and the door 926 in the route image 906).

In various implementations, guidance for different delivery routes may be provided by the same or similar route images and/or visual cues. For example, a different delivery route may include an instruction to "Turn Left Before Security Check", for which the same route image 906 may be utilized and the security check posts 916 may be emphasized as a visual cue, except with an arrow pointing to the left indicating that a carrier is to turn down the hallway to the left. In such an instance, as an alternative or in addition to the emphasis element 914, another emphasis element (e.g., a red "X") may be included across the security check posts 916 to indicate that the carrier is not to proceed through the security check. Alternatively, for such a delivery route, the visible portion of the wall down the hallway to the left may be emphasized as a visual cue (e.g., with a color, an arrow, etc.) indicating that the carrier is to turn left down the hallway.

As described above with respect to FIGS. 1-9, route images including visual cues and associated information may be collected, automatically analyzed, and stored as part of visual route book data sets. When a carrier is to deliver an item, a delivery route may be determined and relevant route images including visual cues and associated information may be determined from a visual route book data set and provided for presentation to the carrier (e.g., as part of a visual route summary, or on-demand as based on a carrier's current location, etc.). It will be appreciated that such techniques may have various advantages. For example, in certain instances it may be desirable to be able to provide descriptions of delivery routes and delivery instructions in a simplified and easy to understand format, such as when carriers are less familiar with established delivery routes (e.g., crowd-sourced carriers, etc.). Many carriers may also already carry mobile devices for routing and accessing maps, and such devices may be utilized for presenting visual route summaries and/or relevant route images and corresponding visual cues and/or descriptions. Such techniques may also have various advantages in regions with limited infrastructure (e.g., limited network and/or GPS access, unnamed roadways, etc.). For example, navigation in such regions may be primarily landmark based (e.g., based on turning or stopping at particular objects or structures rather than particular streets or addresses). Effective instructions for navigation in such regions may be provided by presenting route images with corresponding visual cues, instructions and/or descriptions.

In various implementations, the methods related to visual route book data sets may also be utilized to reduce concessions due to DNR (Delivered but Not Received) items. For example, providing contextual cues in the form of route images and accompanying descriptions may help ensure that an item is delivered to the right delivery location. In addition, route images acquired by carriers (e.g., utilizing wearable cameras, etc.) may also provide recorded evidence regarding deliveries. The automatic analyzing of route images based on visual saliency factors (e.g., as described above with respect to FIG. 6) may be applied to detecting anomalies in a delivery process (e.g., for determining an incorrectly delivered item, an inconsistent delivery location, etc.). Such techniques may be utilized to improve training and/or otherwise address issues regarding the incorrect delivery of items.

In various implementations, user-generated content (UGC) may be utilized for specifying and validating delivery route and delivery location information. Users who order items may be enabled to specify contextual details related to a delivery route or delivery location. For example, a user may provide a route image indicating a placement location (e.g., on a back porch, in a milkbox, etc.) at delivery location along a delivery route where an item is to be placed for delivering the item to the user, and/or may provide other route images or associated information regarding a delivery route or delivery location. Such route images and accompanying descriptions serve as effective methods for communicating contextual details about delivery locations and delivery routes. Various users may provide numerous such route images, and in some instances an automatic analysis of such route images based on visual saliency factors (e.g., as described above with respect to FIG. 6) may be utilized for determining (e.g., vetting and validating) the user-generated content for inclusion in a visual route book data set and/or visual route summary, etc.

In various implementations, certain types of carriers utilizing autonomous transportation methods (e.g., self-driving vehicles, automated aerial vehicles, etc.) may utilize visual data (e.g., route images and associated information) for navigation and routing. For example, various types of navigation techniques (e.g., utilizing dead reckoning, route correction, etc.) may rely on such visual data. As part of such navigation techniques, various types of sensors (e.g., cameras, 3D scanners, LIDARs, etc.) may be utilized to acquire visual information for navigation, and such acquired visual information may be compared to stored visual information (e.g., including route images in a visual route book data set) for assisting with navigation and routing.

Figure 10:
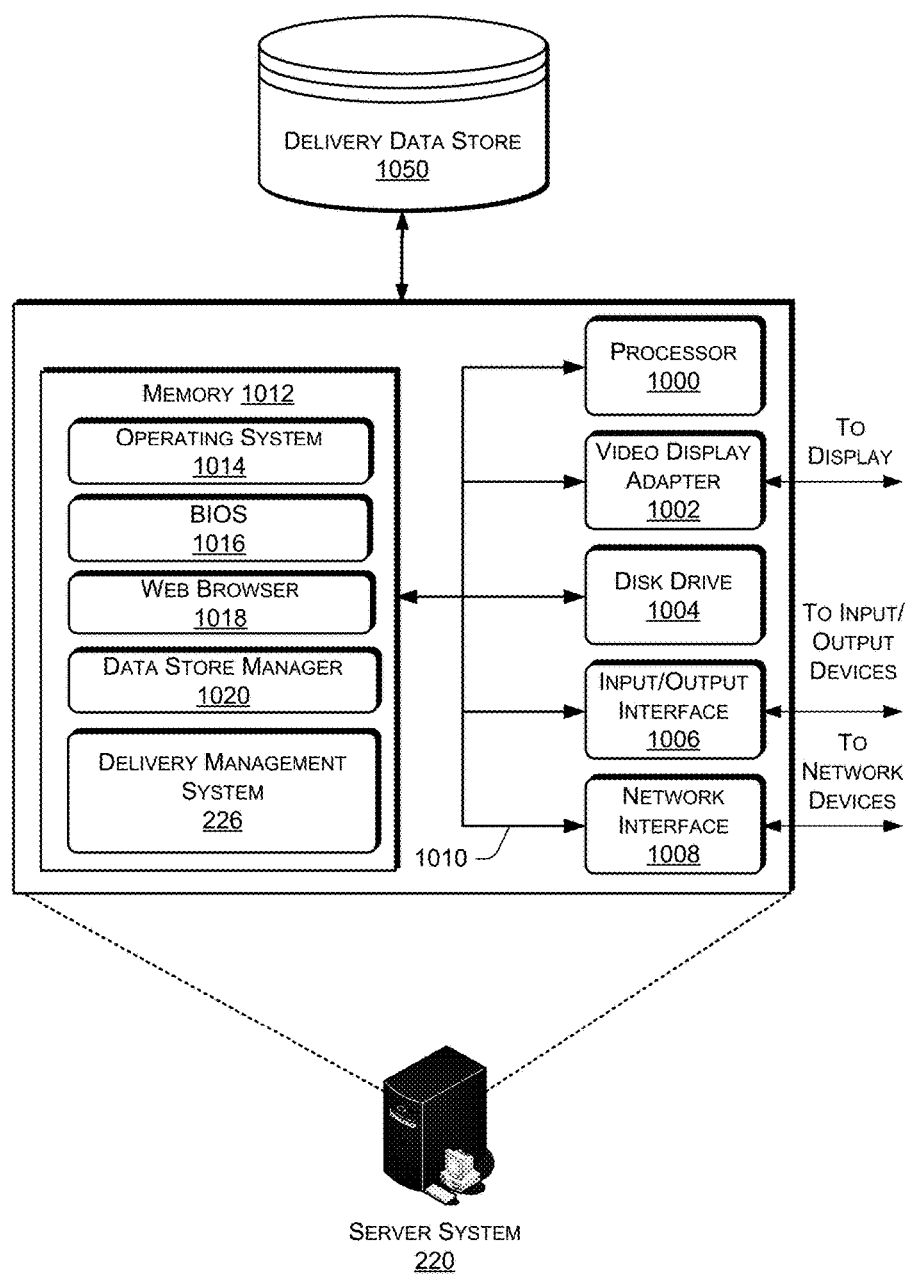
FIG. 10 is a block diagram of an illustrative implementation of a server system that may be used with various implementations.

FIG. 10 is a block diagram of an illustrative implementation of a server system, such as the server system 220, which may be used in the implementations described herein. The server system 220 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an agent of the server system 220 to monitor and configure operation of the server system 220 and/or to provide information (e.g., regarding deliveries by carriers 240, etc.). The input/output interface 1006 likewise communicates with external input/output devices not shown in FIG. 10, such as a mouse, keyboard, scanner, or other input and output devices that can be operated by an agent of the server system 220. The network interface 1008 includes hardware, software, or any combination thereof, to communicate with other computing devices. For example, the network interface 1008 may be configured to provide communications between the server system 220 and other computing devices, such as that of a remote computing resource 210, or a carrier's mobile device, etc., via a network.

The memory 1012 generally comprises random access memory (RAM), read-only memory (ROM), flash memory, and/or other volatile or permanent memory. The memory 1012 is shown storing an operating system 1014 for controlling the operation of the server system 220. A binary input/output system (BIOS) 1016 for controlling the low-level operation of the server system 220 is also stored in the memory 1012.

The memory 1012 additionally stores program code and data for providing network services to the delivery management system 226, etc. Accordingly, the memory 1012 may store a browser application 1018. The browser application 1018 comprises computer executable instructions, that, when executed by the processor 1000 generate or otherwise obtain configurable markup documents such as Web pages. The browser application 1018 communicates with a data store manager application 1020 to facilitate data exchange between a delivery data store 1050 and the delivery management system 226, etc.

As used herein, the term "data store" refers to any device or combination of devices capable of storing, accessing, and retrieving data, which may include any combination and number of data servers, databases, data storage devices and data storage media, in any standard, distributed or clustered environment. The server system 220 can include any appropriate hardware and software for integrating with the delivery data store 1050 as needed to execute aspects of one or more applications for a delivery management system 226, etc.

The delivery data store 1050 can include several separate data tables, databases or other data storage mechanisms and media for storing data relating to a particular aspect. For example, the illustrated delivery data store 1050 includes mechanisms for maintaining information related to operations, inventory, maps, GPS data, carriers, delivery routes, visual route book data sets, visual route summaries, route images, associated metadata, etc., which can be used to generate and deliver information (e.g., regarding delivery routes) to a delivery management system 226, or a remote computing resource 210, or a mobile device of a carrier 240, etc. It should be understood that there may be additional aspects that can be stored in the delivery data store 1050 and that additional data stores beyond the one illustrated may be included. The delivery data store 1050 is operable, through logic associated therewith, to receive instructions from the server system 220 and obtain, update or otherwise process data in response thereto.

The memory 1012 may also include part or all of the delivery management system 226, discussed above. The delivery management system 226 may be executable by the processor 1000 to implement one or more of the functions of the server system 220. In one implementation, the delivery management system 226 may represent instructions embodied in one or more software programs stored in the memory 1012. In another implementation, the delivery management system 226 can represent hardware, software instructions, or a combination thereof.

The server system 220, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer implemented method for analyzing route images, the method comprising:
   under control of one or more computing systems configured with executable instructions,
   determining delivery routes for carriers for delivering items to delivery locations;
   receiving a plurality of route images from recording devices carried on the delivery routes by the carriers;
   receiving, from a velocity sensor, sensor information indicating stops and starts of movement of a carrier along a delivery route;
   selecting a first route image from the plurality of route images for inclusion in a visual route book data set, the selecting being based at least in part on the sensor information indicating that the first route image was taken at a stopping location along the delivery route;

identifying a visual cue associated with the delivery route in the first route image;

recording the first route image and associated visual cue in the visual route book data set; and selecting one or more route images from the visual route book data set for presentation to a carrier to assist the carrier in navigating along the delivery route that the visual cue is associated with, wherein the one or more route images that are selected include the first route image and the visual cue is indicated to the carrier by an emphasis element that is included in the presented first route image.

2. The computer implemented method of claim 1, wherein at least one of the recording devices is worn by a carrier or mounted on a vehicle while traveling on one of the delivery routes.

3. The computer implemented method of claim 1, wherein at least two of the received plurality of route images are included in a video sequence of route images that is received from one of the recording devices.

4. The computer implemented method of claim 1, further comprising not selecting a second route image of the plurality of route images for inclusion in the visual route book data set based at least in part on the sensor information indicating that the second route image was not taken at a stopping location along the delivery route.

5. The computer implemented method of claim 1, wherein the first route image is acquired inside a structure in which a carrier is required to navigate on foot as part of the delivery route and the stopping location along the delivery route where the first route image was taken is inside the structure.

6. The computer implemented method of claim 1, wherein the first route image is of an object at the stopping location along the delivery route.

7. A computer implemented method, comprising:
under control of one or more computing systems configured with executable instructions,
receiving, from a velocity sensor, sensor information indicating stops and starts of movement;
selecting a first route image from a plurality of route images for inclusion in a visual route book data set, the selecting being based at least in part on the sensor information indicating that the first route image was taken at a stopping location along a delivery route;
determining a delivery route for a carrier for delivering an item to a delivery location;
selecting one or more route images from the visual route book data set for presentation to the carrier to assist the carrier in navigating along the delivery route, wherein the selected one or more route images include the first route image;
identifying a visual cue in the first route image based at least in part on the delivery route for the carrier; and
providing the selected one or more route images for presentation to the carrier, wherein the visual cue is indicated to the carrier by an emphasis element that is included in the presented first route image.

8. The computer implemented method of claim 7, further comprising providing an instruction for presentation to the carrier that is related to the first route image, wherein the instruction is determined from metadata that is included in the visual route book data set.

9. The computer implemented method of claim 7, further comprising selecting a second route image from the plurality of route images for inclusion in the visual route book data set based at least in part on an indication that the second route image corresponds to a transition along the delivery route, and the transition occurs due to at least one of a turn, an exit, a ramp, a traffic condition, a detour, a speed limit, or a school zone.

10. The computer implemented method of claim 7, wherein the first route image corresponds to at least one of a parking location, a delivery location, or a placement location.

11. The computer implemented method of claim 7, further comprising providing an instruction for presentation to the carrier that indicates at least one of a shape or a color that is included in the first route image.

12. The computer implemented method of claim 7, wherein the first route image includes at least one of a doorway, stairway, elevator, counter or desk that is located along the delivery route.

13. The computer implemented method of claim 7, wherein the first route image indicates a placement location where the item is to be placed by the carrier for delivering the item.

14. A computing system, comprising:
one or more processors; and
a memory coupled to the one or more processors and storing program instructions that when executed by the one or more processors cause the one or more processors to at least:
receive a plurality of route images that have been acquired at locations along a delivery route;
receive associated location information that indicates the locations along the delivery route where the route images were acquired;
receive associated sensor information from a velocity sensor that indicates stops and starts of movement along the delivery route;
perform an analysis to select which route images from the plurality of route images will be included in a visual route book data set, wherein the analysis that is performed is based at least in part on the sensor information and includes at least:
selecting a first route image from the plurality of route images for inclusion in the visual route book data set based at least in part on the sensor information indicating that the first route image was taken at a stopping location along the delivery route;
based on the selection of the first route image for inclusion in the visual route book data set, store the first route image as part of the visual route book data set; and
select one or more route images from the visual route book data set for presentation to a carrier to assist the carrier in navigating along the delivery route, wherein the one or more route images that are selected include the first route image.

15. The computing system of claim 14, wherein the analysis to select which route images from the plurality of route images will be included in the visual route book data set is further based at least in part on content analysis, and the content analysis includes utilizing a computer vision algorithm for detecting an object in a route image.

16. The computing system of claim 15, wherein the content analysis includes comparing the first route image to a prior route image that was acquired at the same location along the delivery route, the object that is detected in the first route image represents a change from the prior route image, and the first route image is selected based at least in part on the change.

17. The computing system of claim 14, wherein the analysis to select which route images from the plurality of route images will be included in the visual route book data set is further based at least in part on motion analysis, and the motion analysis includes determining at least one motion vector.

18. The computing system of claim 17, wherein the at least one motion vector is utilized for determining a relative movement which corresponds to at least one of a transition or a stop along the delivery route.

19. The computing system of claim 14, wherein the analysis to select which route images from the plurality of route images will be included in the visual route book data set is further based at least in part on a carrier action that was performed when a route image was acquired.

20. The computing system of claim 14, wherein the memory further includes program instructions that when executed by the one or more processors cause the one or more processors to include a second route image in the visual route book data set that is provided by a user and indicates a placement location where an item is to be placed for delivering the item to the user.

* * * * *